(No Model.)
S. W. CATELY.
THILL COUPLING.
No. 505,438. Patented Sept. 26, 1893.
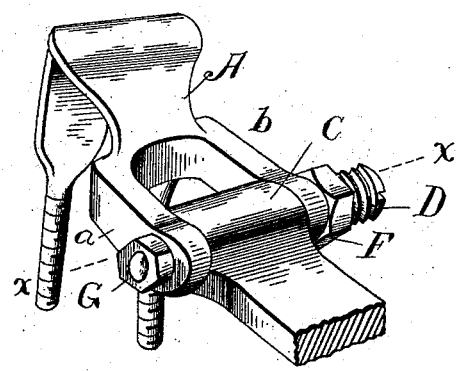
Fig. 1.
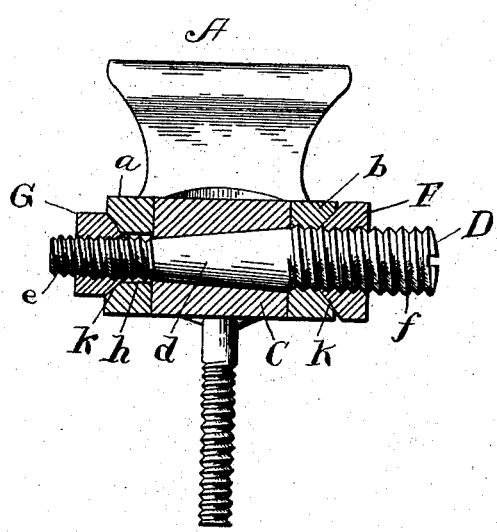
Fig. 2.
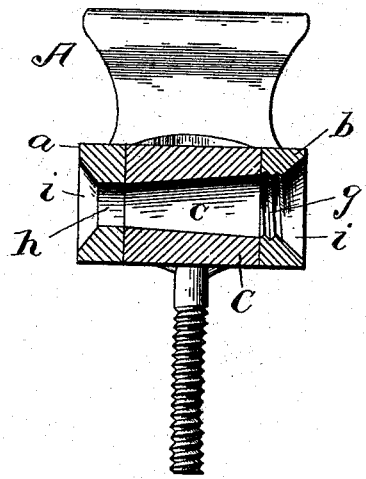
Fig. 3.
Fig. 4.
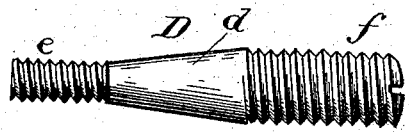
WITNESSES
H. D. Orr.
J. H. Griffin.
INVENTOR
Shepard W. Cately
by
M. D. Peck
His Attorney

United States Patent Office.

SHEPARD W. CATELY, OF CORTLAND, NEW YORK, ASSIGNOR TO ALICE M. ETTLING, OF SAME PLACE.

THILL-COUPLING.

SPECIFICATION forming part of Letters Patent No. 505,438, dated September 26, 1893.

Application filed May 15, 1893. Serial No. 474,284. (No model.)

*To all whom it may concern:*

Be it known that I, SHEPARD W. CATELY, a citizen of the United States, residing at Cortland, in the county of Cortland and State of New York, have invented certain new and useful Improvements in Thill-Couplings; and I do hereby declare the following to be a full, clear, and exact description of the invention, such as will enable others skilled in the art to which it appertains to make and use the same, reference being had to the accompanying drawings, which form part of this specification.

My invention relates to thill couplings, and has for its object the improvement in construction of such devices whereby the wear of the parts may be taken up and rattling prevented and consists in the construction hereinafter described and more particularly pointed out in the claim.

Referring to the drawings, Figure 1, is a perspective view of my improved thill coupling. Fig. 2, is a section on the line $x$—$x$ of Fig. 1; Fig. 3, a similar section, the bolt and its nuts being removed, and, Fig. 4, a view of the bolt detached.

Similar letters of reference indicate corresponding parts in each figure of the drawings.

A is an axle clip having ears $a$, and $b$, extending therefrom in the usual manner.

C represents the eye of a carriage shaft provided with a conical hole $c$.

D is a bolt having the plain conical central portion $d$, and the threaded cylindrical end portions $e$ and $f$, the latter being the larger. The ear $b$ of the clip is provided with a threaded hole $g$, in which the threaded end $f$, of the bolt D fits; and the ear $a$, of the clip is provided with an unthreaded hole $h$, through which the small threaded end portion $e$, of the bolt D passes loosely. Each of the holes $g$ and $h$ is countersunk on its outer side as shown at $i$.

F and G represent nuts which are adapted to fit respectively on the threaded ends $f$, and $e$, of the bolt D. These nuts F and G each have a conical end, indicated by $k$, which fits in the countersinks $i$.

In fitting the parts together the eye C is placed in position between the ears $a$ and $b$, and the bolt D pushed through the openings in the ears and eye until the threaded portions $g$ and $f$ engage, when the bolt must be turned until its conical portion $d$, fits snugly in the conical opening $c$, of the eye. The nut G is now screwed on the small threaded end $e$, of the bolt and by reason of its conical end $k$, entering the countersink $i$, of the hole $h$, it will center the bolt in said hole and hold the ends of the eye C square to the inner faces of the ears $a$ and $b$, and at the same time keep the threaded portion $e$, out of contact with the wall of the opening $h$, thus preventing injury to the threads and unequal wear of any of the parts. The nut F is next screwed onto the large threaded end $f$ of the bolt and screws as a jam nut to keep the parts in position, and also, to a large extent takes the strain on that end of the bolt and thereby reduces the wear on the threaded parts $f$ and $g$ by transferring it to the conical end of said nut and the countersink in which it rests.

In order to take up the wear of the conical part $d$ of the bolt and the conical hole in the eye, the jam nut is loosened and the bolt turned up in the threaded hole $g$ to force the larger end of the conical portion $d$, toward the smaller end of hole $c$, after which the nuts F and G must be tightened up.

To take up wear between the ends of the eye C and the inner faces of the ears, the nut G is screwed up on the bolt which forces the ears toward each other to the extent of the wear, the plain hole $h$ in the ear $a$ permitting this action, and by reason of the conical end of the nut G fitting in the countersink $i$, the bolt is always centered and the parts maintained in proper relative position to each other.

Having thus fully described my invention, what I claim as new, and desire to secure by Letters Patent of the United States, is—

In a thill coupling, the combination with an axle clip having two ears, one provided with a threaded hole and the other with a smaller unthreaded hole, both of said holes being countersunk on their outer sides, of an eye fitting between said ears and provided with a conical opening, a bolt having a plain conical central portion fitting in the conical opening in the eye, a threaded end fitting the threaded hole in the ear, and a smaller threaded end passing through the unthreaded hole in the other ear, and conical nuts for centering the bolt fitting on the threaded ends of said bolt resting in the countersinks in the ears, as set forth.

In testimony whereof I affix my signature in presence of two witnesses.

SHEPARD W. CATELY.

Witnesses:
B. A. BENEDICT,
E. M. WOODWARD.